Figure 1:
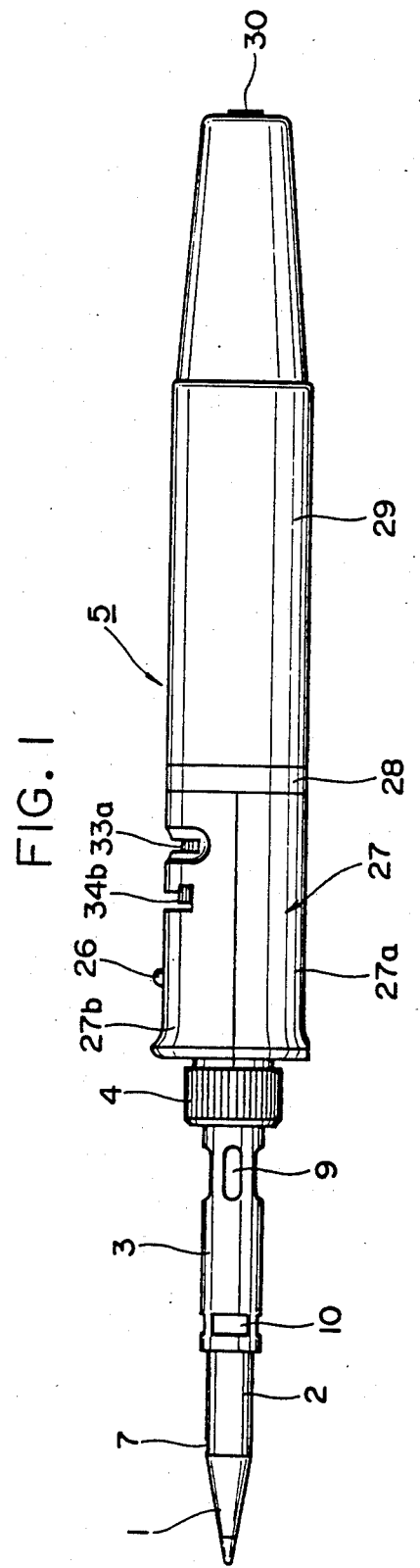

United States Patent [19]

Nakajima

[11] Patent Number: 4,552,124
[45] Date of Patent: Nov. 12, 1985

[54] HEAT PROCESSING APPARATUS
[75] Inventor: Masahiko Nakajima, Tokyo, Japan
[73] Assignee: Nakajima Dokosho Co. Ltd., Tokyo, Japan
[21] Appl. No.: 620,326
[22] Filed: Jun. 12, 1984
[30] Foreign Application Priority Data Feb. 20, 1984 [JP] Japan .................................. 59-30064
Feb. 20, 1984 [JP] Japan .................................. 59-30066

[51] Int. Cl.$^4$ ............................................. B23K 3/02
[52] U.S. Cl. .................................... 126/413; 431/344
[58] Field of Search ............... 126/413, 403, 406, 237, 126/238, 231–234

[56] References Cited

U.S. PATENT DOCUMENTS 4,119,088 10/1978 Sim ..................................... 126/413
4,133,301 1/1979 Fujiwara ............................. 126/413

Primary Examiner—Carroll B. Dority, Jr.
Attorney, Agent, or Firm—Cushman, Darby & Cushman

[57] ABSTRACT

In the heat processing apparatus, a combustible gas evaporated from a liquefied gas tank is mixed with air and supplied from a gas mixture supply means to a combustion chamber, where the gas mixture is subjected to complete and flameless combustion through the catalyst, and the combustion heat is conducted to the iron tip for use in the heat processing of a work. A gas flow channel with a reduced flow resistance is formed continuously through out the catalyst for decreasing the pressure loss in the gas mixture. Further, ignition ports at the inlet of the combustion chamber are provided with a shutter mechanism for closing the ports after the completion of the ignition. The improved structure of the gas flow channel and the shutter cooperate to attain more effective and stable combustion in a compact structure of the apparatus.

11 Claims, 32 Drawing Figures

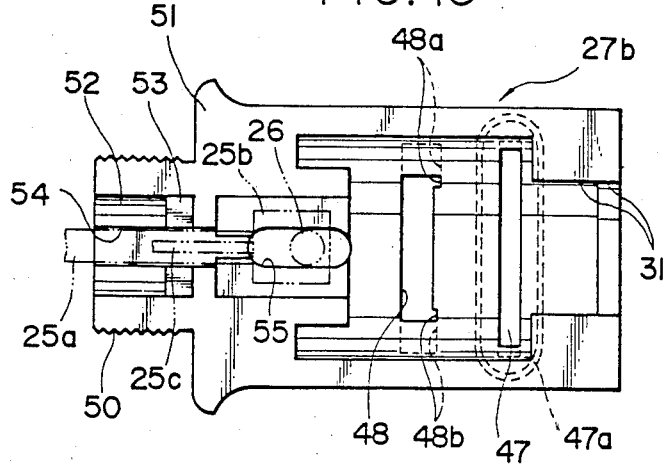
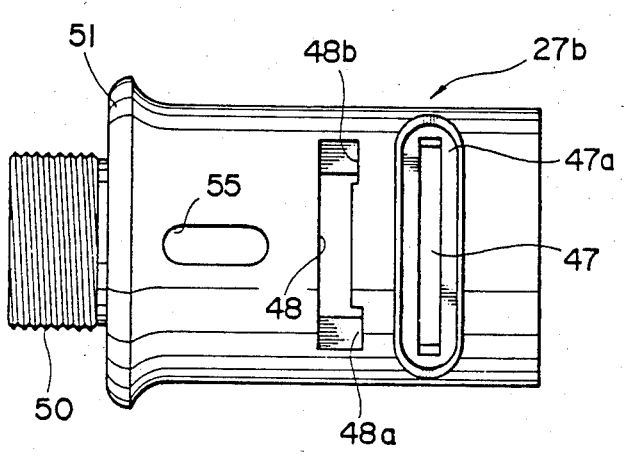
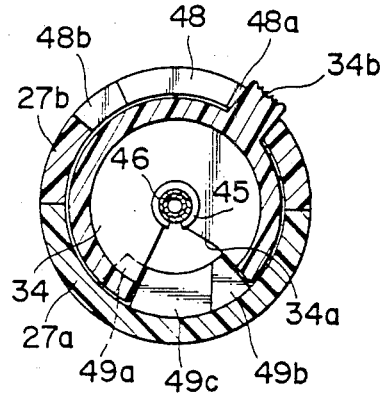
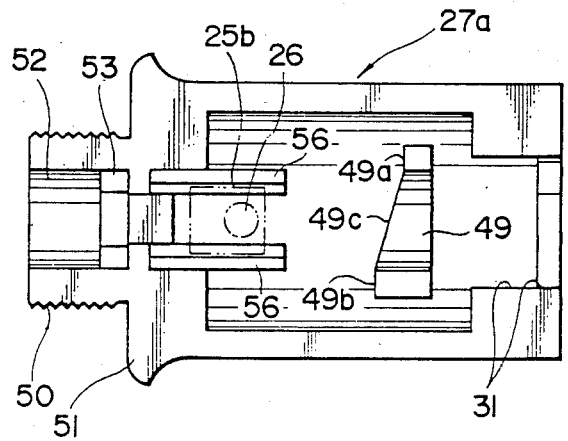

HEAT PROCESSING APPARATUS

BACKGROUND OF THE INVENTION

1. Field of the Invention

This invention concerns a heat processing apparatus, for example, a gas-heated soldering or desoldering tool using a liquefied gas as a heat source for thermally processing various works made of metals, synthetic resins or like other materials.

2. Description of the Prior Art

As a typical example of heat processing apparatus, electrically-heated soldering irons for bonding metal parts or members through fusion of soldering flux, have generally been employed so far because of their simple structure, small size and light weight, as well as easy handlability.

Although gas-heated type soldering irons have also been employed depending on the case, for example, in field works where no electric source is available at hand, their use is not so popular since they are relatively large in the size and heavy in the weight requiring a large volume of gas combustion chamber for the sufficient supply of combustion air, as well as of complicated mechanism for the adjustment of gas concentration and gas feed rate.

However, with the recent development in the integrated circuit industry, disadvantages of using the electrically-heated irons in soldering electronic components or the likes of IC chips have been closed up. That is, if the electrical insulation between the power supply circuit (heater wire, etc.) and the copper tip of a soldering iron is insufficient or degraded during long use, a leak current will flow from the tip to an IC work which may possibly provide a fetal damage to the work even if the current is of a slight value. This trend has increased remarkably as the structure of IC chips has become more and more fine and accurate at present.

In view of the above, while various counter-measures have been taken for improving the electrically-heated soldering irons in order to avoid such undesired current leakage, it seems to be inevitable so long as the soldering irons are operated on the electric power supply.

In the foregoing situation, use of gas-heated soldering irons has now been re-estimated. However, there are many problems in the gas-heated soldering irons when they are actually used for fabricating IC chips or the likes.

At first, generation and exposure of gas flames out of a soldering iron has to be avoided by all means because it may cause danger of fire accidents and also provide damages to the IC chips. Next, the size and the weight of the soldering iron have to be reduced as much as possible, bacause fine and delicate handling is required to the iron upon fabricating IC chips at high accuracy.

In order to dissolve the foregoing problems, a compact and flameless gas heating apparatus has been proposed, for instance, by Fujihara in U.S. Pat. No. 4133301 (issued on Jan. 9, 1979 and now assigned to the assignee of the present application).

Referring briefly to the gas heating apparatus in the form of a gas-heated soldering iron disclosed in the U.S. Patent (for instance, FIG. 9 and relevant descriptions in the specification), liquefied gas from a gas tank 114 is introduced from a needle valve 153 by way of a gas inlet pipe 116 to a tubular connector 140 where it is mixed with airs from air holes 104, and then supplied to a combustion chamber 102. The gas mixture is burnt completely in contact with the catalyst filled in the combustion chamber 102 and then exhausted through apertures 102 formed in the wall of the combustion chamber. The heat produced by the catalytic combustion of the gas mixture is transmitted by way of a heat conductor rod 108 to a tip 109 for use in heating a work to be fabricated.

In the proposed apparatus, the liquefied gas can be burnt completely and efficiently by the aid of the catalyst, as well as generation of gas flame to the outside of the apparatus can remarkably be reduced since the combustible gas is burnt throughly within the combustion chamber in contact with the catalyst and only the exhaust gas ($CO_2$, $H_2O$) is discharged externally.

However, in the apparatus cited above, the catalyst is filled at random in a fiberous or amorphous form within the combustion chamber at a considerably high density and the gas mixture passes through the complicated shape of gaps through the packed catalyst in the combustion chamber. Consequently, when the gas passes through the combustion chamber, there arises a considerable loss in the gas pressure. The gas mixture is generally formed by attracting the surrounding air into a gas stream as it is jetted out from a gas tank through a nozzle at a certain velocity due to the pressure created upon spontaneous evaporization of the liquefied gas (so-called ejector effect). Accordingly, if there is a large gas pressure loss in the combustion chamber, the gas evaporizing velocity at the tank exit is decreased making it difficult to provide a gas mixture of a sufficient air-to-gas ratio. This results in somewhat incomplete combustion in the combustion chamber, whereby an exhaust gas still containing combustible gas is discharged through the exhaustion port and it may flame-up to the outside of the chamber.

Further, the gas mixture is ignited at the inlet of the combustion chamber and an additional air is introduced through an ignition port provided near the upstream end (inlet) of the combustion chamber so that the gas mixture may be ignited effectively. However, since there is a large flow resistance in the combustion chamber as described above, a considerable portion of the ignition gas flame does not direct to the catalyst in the chamber but wastefully escapes through the ignition port externally. Thus, the ignition flame, particularly, the top end thereof at a relatively high temperature can not be effectively utilized for heating the combustion catalyst and it takes a much stand-by time to reach a desired combustion temperature.

In addition, the gas flame may continue to be discharged through the ignition port during soldering operation, which is very dangerous and remarkably reduces the gas utilizing efficiency as well.

OBJECT OF THE INVENTION

Accordingly, it is an object of this invention to provide a heat processing apparatus capable of attaining more complete flameless catalytic combustion of a gas mixture by the reduction in the flow resistance to the gas passing through a combustion chamber.

A further object of this invention is to provide a heat processing apparatus capable of attaining a desirable working temperature in a short time and completely avoiding the exposure of the gas flame out of the apparatus.

SUMMARY OF THE INVENTION

The foregoing objects of this invention can be attained by a heat processing apparatus according to this invention comprising:

a nozzle for jetting out a combustible gas from a liquefied gas tank by way of a gas discharge valve assembly, a gas mixture generation means disposed at the exit of the nozzle for introducing to mix external air to a stream of the combustible gas jetted out from the nozzle under the ejector effect to thereby generate a gas mixture, a gas mixture supply means for supplying the thus generated gas mixture to the downstream portion of the apparatus, an ignition means disposed at the downstream of the gas mixture supply means surrounding the stream of the gas mixture at the downstream of the gas mixture supply means for introducing additional external air through ignition openings formed in the ignition means to thereby effectively ignite the gas mixture, a shutter mechanism provided displaceably to the ignition means so as to open and close the ignition openings, a combustion chamber disposed at the downstream of the ignition means having an inlet at its upstream end for receiving the stream of the gas mixture and an exhaust gas port at its closed downstream end for discharging an exhaust gas, a combustion catalyst carried on a support disposed to the inside of the combustion chamber, the support being formed with a gas flow channel extended continuously from the upstream to the downstream ends of the chamber so as to decrease the flow resistance to the gas mixture passing therethrough, and an iron tip connected to the downstream end of the combustion chamber for use in the fabrication of a work.

In the heat processing apparatus having the foregoing consitution, since the gas mixture introduced into the combustion chamber flows through the gas flow channel with a reduced flow resistance, which extends continuously from the upstream to the downstream of the combustion chamber, the pressure loss in the gas mixture is remarkably decreased, whereby a sufficient amount of external air can be attracted to and mixed with the jetting stream of the evaporized gas and complete flameless combustion can be obtained.

Further, since external air can be introduced additionally at the inlet of the combustion chamber through the ignition openings being sucked by the flow of the gas mixture, the velocity of which is now increased by the improved gas flow channel in the combustion chamber, gas ignition can be facilitated and ignition gas flame can be directed downstream toward the combustion chamber, whereby the entire catalyst can be heated to a desired temperature more rapidly to shorten the standby time for the soldering work.

Furthermore, since the ignition openings can be closed after the gas ignition by the shutter means disposed thereto, undesired flaming-up of the gas mixture through the openings to the external atmosphere can be interrupted completely.

The gas flow channel formed to the catalyst in this invention may be formed, for example, as disclosed in my Japanese Patent Application No. 219497/1982 filed on Dec. 15, 1982 but not yet laid open to public.

In a preferred embodiment, the gas flow channel comprises through holes disposed to the inside of the catalyst and/or peripheral grooves formed at the outer circumference of the catalyst continuously from the upstream to the downstream ends thereof.

The shutter mechanism in this invention can be embodied in various ways provided that it can open and close the ignition openings.

In a preferred embodiment, the shutter mechanism comprises a tubular shutter member disposed coaxially along the circumferential wall of the ignition means so as to be slidable in the gas flowing direction and an actuation member connected to said tubular shutter member for causings the shutter member to slide in the gas flowing direction to thereby open and close the ignition openings.

In another preferred embodiment, the shutter mechanism comprises a tubular shutter member disposed coaxially along the circumferential wall of the ignition means so as to be slidable in the circumferential direction to the ignition means and an actuation member connected to the shutter member for causing the shutter member to slide in the circumferential direction to thereby open and close the ignition openings.

Smooth flow of the gas mixture, particularly upon ignition, obtained in accordance with this invention can further be improved by the provision of a gas stream rectifying member at the downstream end of the gas mixture supply means and near the ignition openings for controlling the flow direction of the gas mixture.

In a preferred embodiment, the gas stream rectifying member comprises a main gas flow cylinder disposed at the axial gas flowing center of the gas mixture supply means and a plurality of auxiliary gas flow channels disposed around the outer periphery of the main gas flow cylinder, whereby the stream of the gas mixture jetted out from the gas mixture supply means forms a rectified shape composed of a central region issued from the main gas flow cylinder and a peripheral region from the auxiliary gas flow channels surrounding it, which is converged to the downstream to constitute a high temperature flame tip at the inlet of the combustion chamber upon ignition.

The heat processing apparatus according to this invention can be used as a usual soldering or desoldering iron adapted to transmit the heat of an iron tip directly onto a work and also as a so-called hot blow type iron adapted to heat the work by using the exhaust gas at a high temperature discharged from the iron tip.

In a preferred embodiment, the exhaust gas ports of the combustion chamber are opened in a direction so as to deviate the exhaust gas stream from the top end of the iron tip, whereby a work is processed directly by the heat transmitted from the iron tip.

In another embodiment, an exhaust gas port of the combustion chamber is opened at the top end of an iron tip, whereby a work is processed by means of the hot blow of the exhaust gas discharged from the iron tip.

In a still further embodiment, the tip is made detachable from the combustion chamber, whereby the iron tip of various size and configuration can be replaced with ease.

In another embodiment, the iron tip together with the combustion chamber are made detachable from the remaining part of the apparatus, whereby the remaining part can be used as a so-called torch lamp.

The heat processing apparatus according to this invention can further be modified in various ways for the actual use.

In a modified embodiment, a monitor hole is formed through the wall of the combustion chamber, whereby the combustion temperature can be observed visually from the outside by the color of the light emitted from the catalyst.

In another modified embodiment, the exhaust port formed in the combustion chamber is used as the catalyst monitor hole.

In addition, the structure of the heat-processing apparatus using the liquefied gas source can be simplified by the skillfull arrangement for the gas discharge mechanism.

In a preferred embodiment, the gas discharge valve assembly comprises, a valve body disposed within a casing and adapted to slide toward the downstream against a resiliency of a spring to discharge the liquefied gas out of the liquefied gas tank, a rotatable ON-OFF actuation member mounted to the valve body so as to be slidable integrally therewith at least on the downstream sliding of the valve body, an actuation knob loosely engaged within a guide hole circumferentially perforated in the casing so as to rotate the ON-OFF actuation member out of the casing, and a guide member disposed to the inside of the casing at a position diametrically opposing to the guide hole for guiding the ON-OFF actuation member such that at least a portion of the actuation member to be guided is displaced along the sliding direction of the valve body accompanying the rotation of the actuation member to thereby open the discharge valve, whereby the discharge of the gas can surely and easily be attained in a simple and compact structure.

BRIEF DESCRIPTION OF THE ACCOMPANYING DRAWINGS

Figure 2:
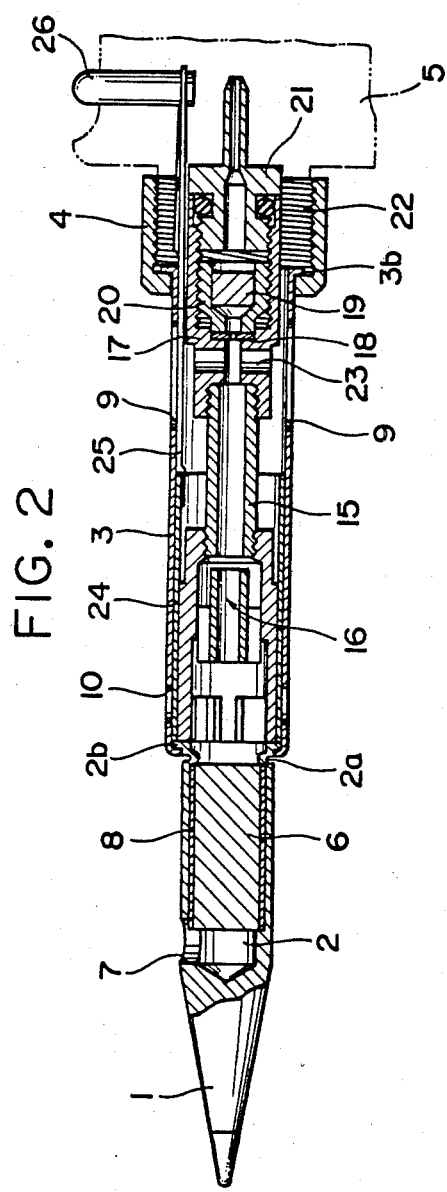
Figure 3:
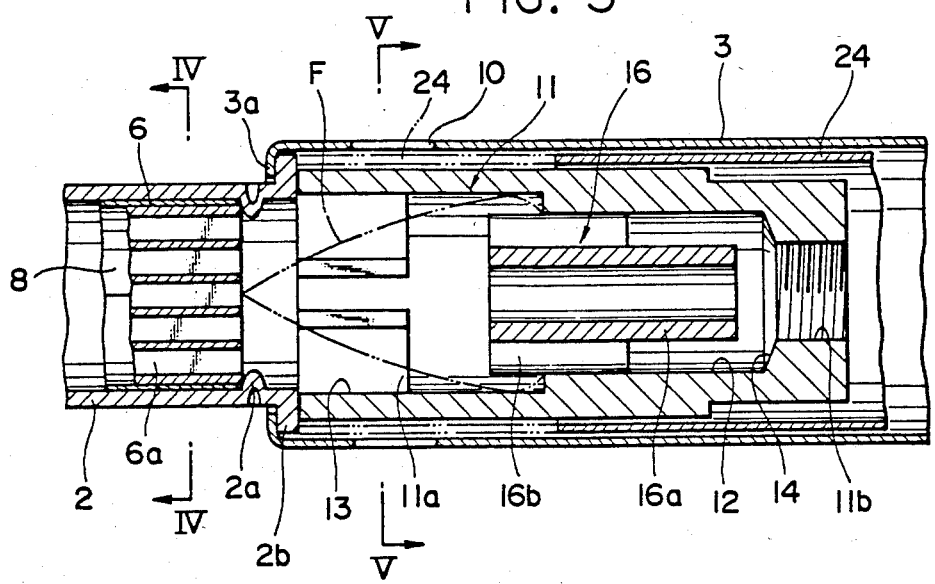
Figure 4:
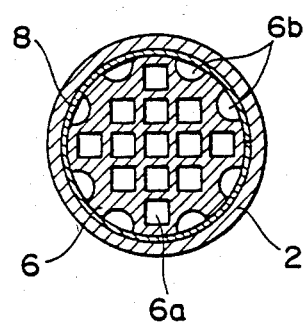
Figure 5:
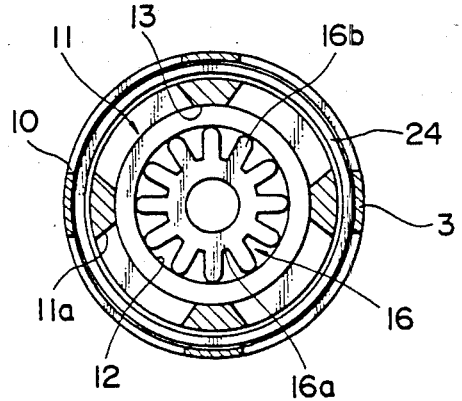
Figure 6:
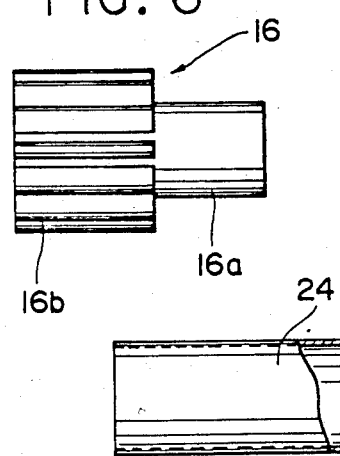
Figure 7:
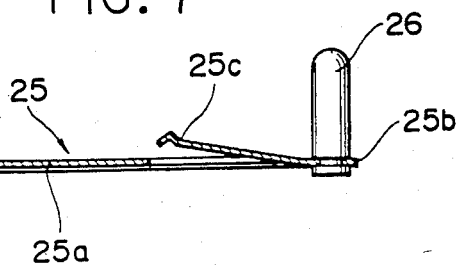
Figure 9:
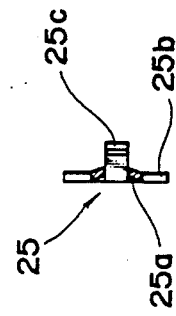
Figure 8:
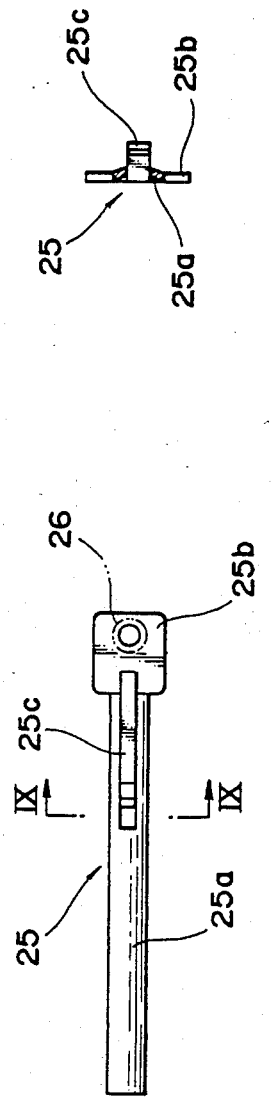
Figure 10:
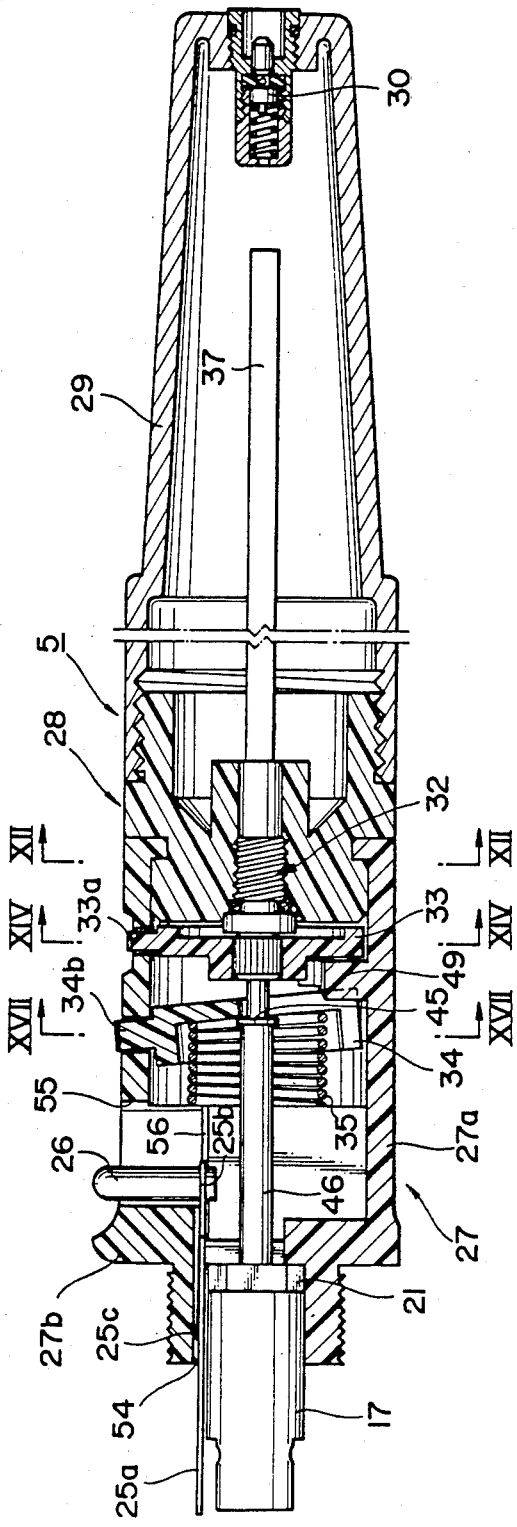
Figure 11:
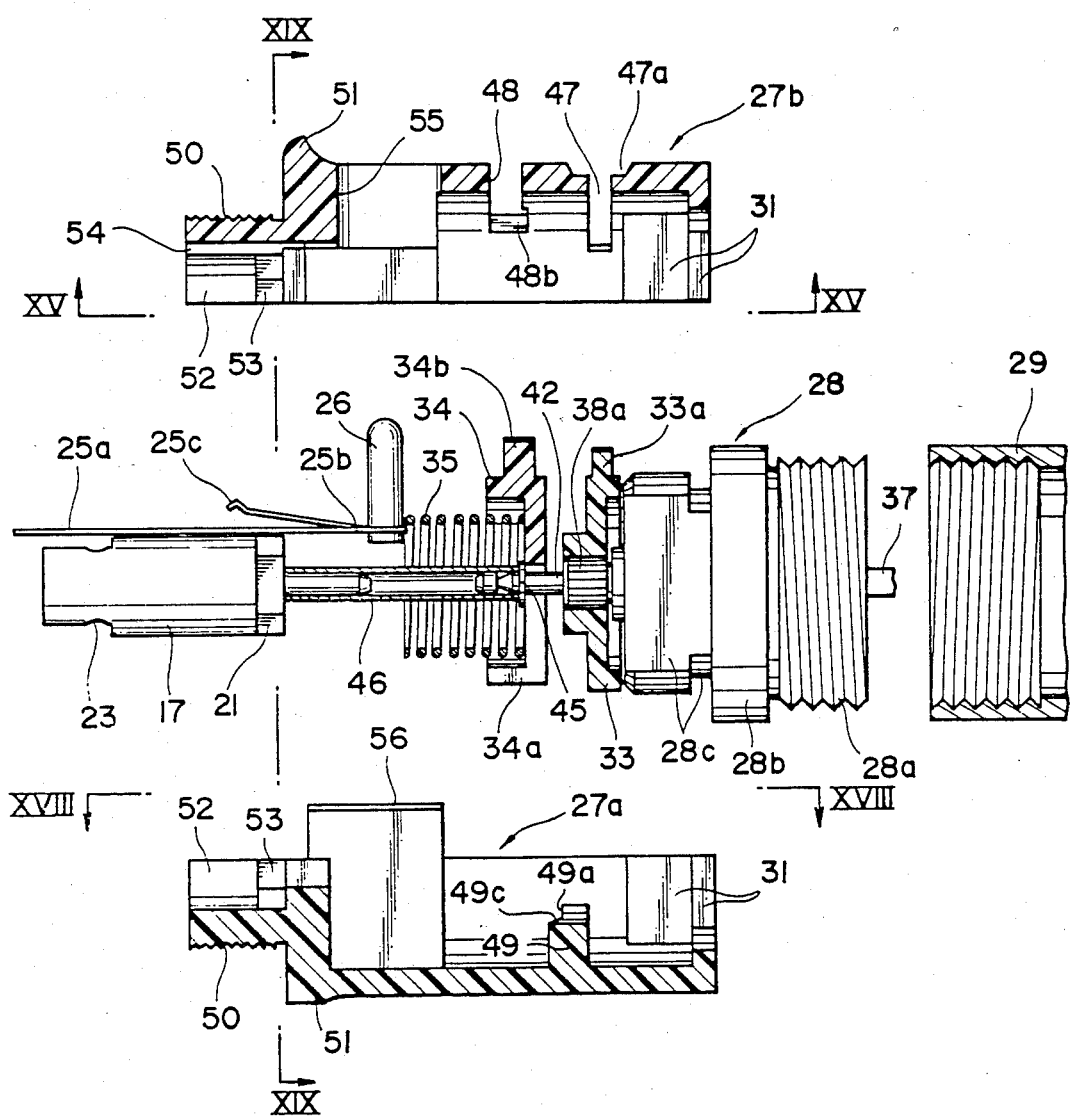
Figure 12:
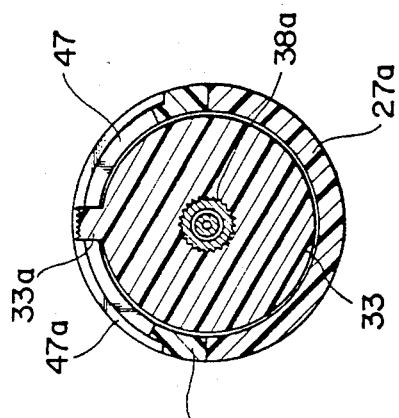
Figure 14:
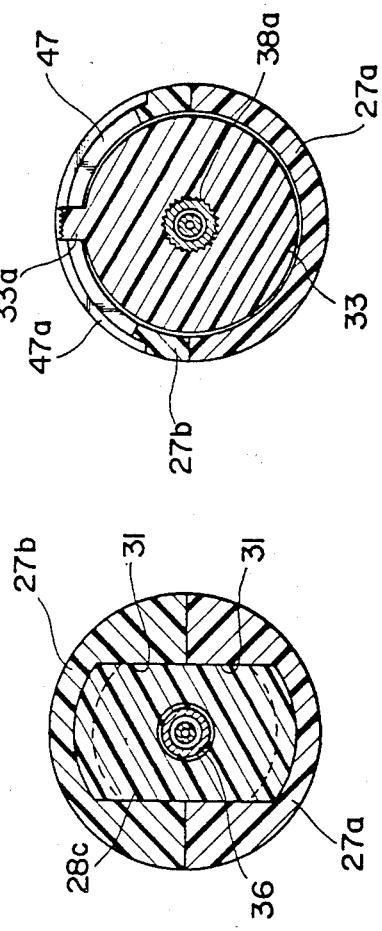
Figure 13:
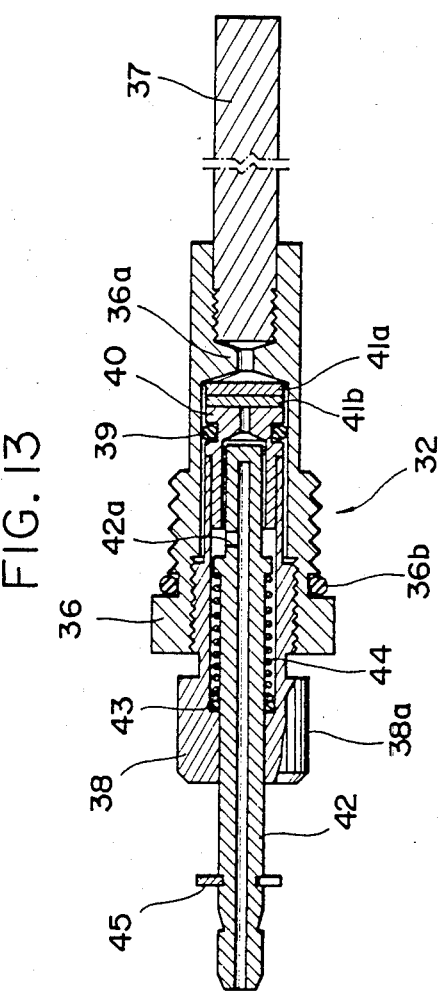
Figure 19:
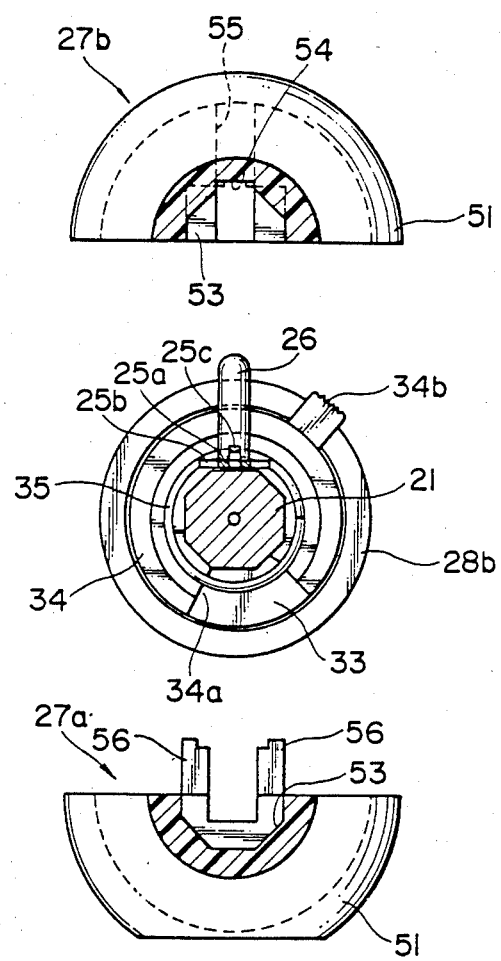
Figure 27:
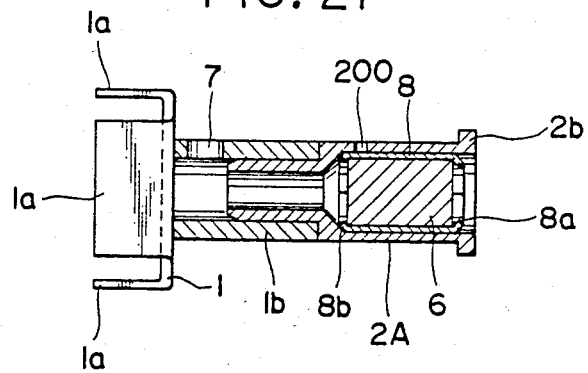
Figure 28:
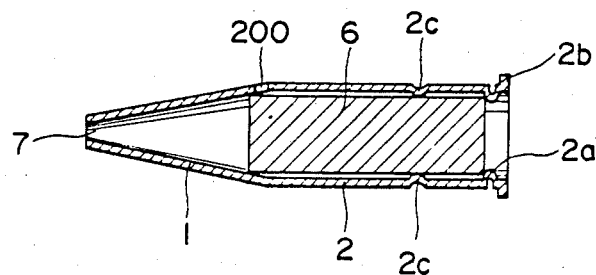
Figure 29:
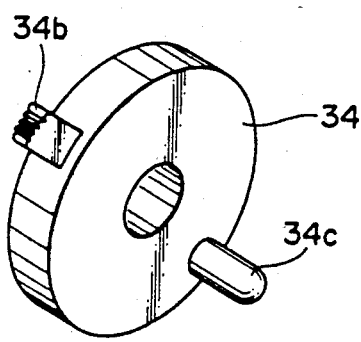
Figure 30:
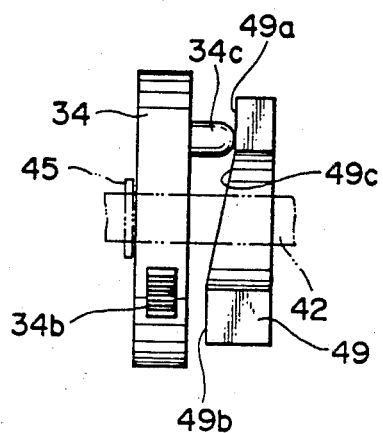
Figure 31:
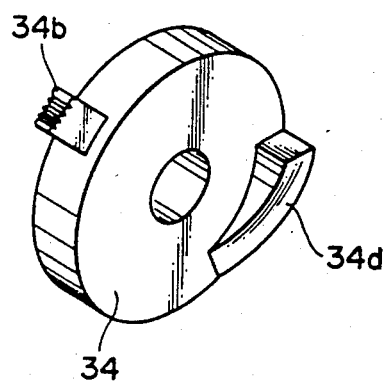
Figure 32:
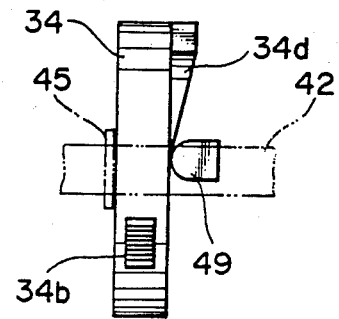

These and other objects, as well as the features of this invention will now be made more clearer by reading the descriptions for the preferred embodiments of this invention while referring to the accompanying drawings, wherein:

FIG. 1 is a side elevational view for the entire portion of a gas-heated soldering iron as a preferred embodiment according to this invention, FIG. 2 is a side elevational view, partly in cross section, for a portion of said gas-heated soldering iron shown in FIG. 2, FIG. 3 is a cross sectional view showing a part of a combustion chamber and a gas mixture supply means for the embodiment shown in FIG. 3, FIG. 4 is a cross sectional view for the combustion chamber and the catalyst taken along line IV—IV in FIG. 3, FIG. 5 is a cross sectional view for the gas flow rectifying member taken along line V—V in FIG. 3, FIG. 6 is a side elevational view of the gas rectifying member shown in FIG. 5, FIG. 7 is a side elevational view for the shutter mechanism for use in the embodiment of this invention, FIG. 8 is a top plan view for a part of the shutter mechanism shown in FIG. 7, FIG. 9 is a cross sectional view for the shutter mechanism taken along line IX—IX in FIG. 9, FIG. 10 is a cross sectional view for illustrating the gas discharge assembly for use in the embodiment of this invention, FIG. 11 is an exploded explanatory view for the portion shown in FIG. 10, FIG. 12 is a cross sectional view taken along line XII—XII in FIG. 10, FIG. 13 is a cross sectional view for the gas discharge valve shown in FIG. 12, FIG. 14 is a cross sectional view taken along line XIV—XIV in FIG. 10, FIG. 15 is an inner view for the upper half part taken along line XV—XV in FIG. 11, FIG. 16 is a top plan view for the upper half part shown in FIG. 15, FIG. 17 is a cross sectional view of the ON-OFF actuation member taken along line XVII—XVII in FIG. 10, FIG. 18 is a inner view for the lower half part taken along line XVIII—XVIII in FIG. 11, FIG. 19 is an illustrative exploded view taken along line XIX—XIX in FIG. 11, FIG. 20 through FIG. 28 show cross sectional views for different embodiments of the iron tip and the combustion chamber for use in this invention, FIG. 29 and FIG. 30 show another embodiment of the OF-OFF actuation member, and FIG. 31 and FIG. 32 show a still another embodiment of the ON-OFF actuation member.

PREFERRED EMBODIMENT OF THE INVENTION

This invention will now be described more specifically by way of its preferred embodiment while referring to the accompanying drawings.

FIG. 1 illustrates a gas-heated soldering iron as a preferred embodiment of the heat processing apparatus according to this invention, which mainly comprises a iron tip 1 for soldering, a combustion chamber 2 combined with the tip 1 and a grip casing 5 connected to the base end of the combustion chamber 2 by way of a support pipe 3 and a connection nut 4.

As shown in FIG. 1 through FIG. 3, the combustion chamber 2 connected to the base end of the tip 1 has a cylindrical configuration closed at its top end and contains a combustion catalyst 6 being secured to the inside of the chamber at its restricted part 2a (FIGS. 2, 3). The combustion chamber 2 has an exhaust gas port 7 at the circumferential wall of its downstream end and engages at its outer flange 2b to the inner flange 3a of the support pipe 3 (FIG. 3).

As shown in FIGS. 3 and 4, the combustion catalyst 6 has a cylindrical configuration, in which a plurality of through holes 6a each in a square cross section are perforated through its inside and a plurality of U-shaped grooves 6b are formed at its outer circumferential surface both being extended along the axial direction (gas flow direction). The plenum defined by the through holes 6a and the grooves 6b constitute a gas flow channel extended continuously and linearly from the upstream to the downstream of the combustion chamber 2, and it provides a reduced resistance to a gas mixture flowing through the chamber 2. A cylindrical protection pipe 8 made of a corrosion resistant metal such as stainless steel is inserted between the combustion chamber 2 and the combustion catalyst 6 so that copper metal, the ordinary constituent material of the combustion chamber 2 does not migrate to the combustion catalyst 6 during high temperature combustion and reduce the catalytic action.

The support pipe 3, for example, made of corrosion resistant metal material such as stainless steel has an outer flange 3b at the upstream end to retain the nut 4 from slipping off. At the circumferential wall of the pipe 3, there are perforated air introduction ports 9 at the upstream and ignition ports 10 at the downstream.

As shown specifically in FIG. 5, the ignition ports 10 are disposed by four through the pipe 3 in an equi-circumferential pitch, and corresponding ignition openings 11a are also formed to a fire nozzle 11 which is coaxially fitted to the inner circumference of the pipe 3 for the ignition of the gas mixture.

Aslo as shown in FIG. 3 and FIG. 5, the fire nozzle 11 has a smaller-diameter bore 12 on the upstream and a larger-diameter bore 13 on the downstream. The smaller-diameter bore 13 is narrowed toward the upstream by way of a tapered part 14 into a threaded bore 11b for screw engagement with the downstream end of a connection pipe 15 made of stainless steel (shown in FIG. 2).

A gas flow rectifying member 16 is tightly fit to the inside of the smaller-diameter bore 12. As shown most clearly in FIG. 5 and FIG. 6. The rectifying member 16 comprises a central hollow cylinder 16a and a gear-like member 16b disposed integrally with the outer periphery of the cylinder 16a. Both downstream ends of the parts 16a, 16b are protruded from the smaller-diameter bore 12 to the larger bore 13 (FIG. 3). In this structure, a gas mixture composed of liquefied gas and air supplied by way of the connection pipe 15 in communication with the fire nozzle 11 is jetted out partly through the inside of the central cylinder part 16a and partly through the channels defined between each of the teeth of the gear-like member 16b, to form a stable and rectified gas stream.

Further, a gas mixture generation member 17, as already shown in FIG. 2, is in a threaded engagement to the upstream end of the connection pipe 15, and a nozzle plate 18 and a filter member 19 are incorporated to the inside of the gas mixture generation member 17. The nozzle plate 18 is made of a disc member having a central nozzle hole with an accurate circular shape of 50–100μ and, preferably, 80–90μ diameter and fixed between the member 17 and a cylindrical retainer 20 screwed therein from the upstream end of the member 17. A filter member 19 made of porous sintered alloy, for instance, of about 10μ pore size is inserted to fit into the retainer member 20 by caulking. Further, a connection member 21 is secured into the gas mixture generation member 17 in a gas tight manner by way of an O-ring 22. The upstream end of the connection memer 21 and of the gas mixture generation member 17 are protruded out of the upstream end of the support pipe 3 and held within the grip casing 5 as described later.

Air introduction ports 23 are perforated through the wall of the gas mixture generation member 17 at a position near the exit of the nozzle plate 18, so that external airs may be attracted through the air introduction ports 9 formed in the pipe 3 and the air introduction ports 23 by the ejector effect of a liquefied gas jetted out from the nozzle plate 18 to generate a gas mixture.

Then, as shown in FIGS. 2, 3 and 5, as one of the most important features of this invention, a shutter mechanism is disposed coaxially between the inner wall of the support pipe 3 and the outer wall of the fire nozzle 11 slidably along the gas flow direction, that is, the axial direction of the support pipe 3 so as to open and close both of the ignition ports 10, 11a formed in the support pipe 3 and the fire nozzle 11 respectively.

As shown, particularly in FIG. 7, the shutter mechanism comprises a cylindrical or tubular shutter member 24, an actuation lever 25 and an actuation button 26. Specifically, a shown in FIG. 7 through FIG. 9, the actuation lever 25 comprises a gangway connection part 25a which integrally connects the base end of the shutter member 24 with a square plate part 25b for mounting the actuation button 26. The base end of the connection part 25a is partly cut out and raised to form an integral spring part 25c. As detailed later, the shutter mechanism comprising the shutter member 24 and the actuation button 26 is disposed axially slidably to the inner circumference of the connection pipe 3 and the grip casing 5 so as to close and open the ignition ports 10.

As shown in FIG. 1 and, particularly, in FIG. 10, the grip casing 5 comprises a top member 27 mounted with various actuation members such as the actuation button 26 or the like and a gas tank 29 connected to the upstream end of the top member 27 by way of a transparent discharge valve holder 28. An injection valve 30 for liquefied butane gas is attached to the upstream of the gas tank 29.

As shown in FIG. 10 through FIG. 12, the top member 27 is bisected into a lower half part 27a and an upper half part 27b, which join vertically to each other to embrace the discharge valve holder 28 therebetween while preventing it from rotation and slip-off.

The discharge valve holder 28 is screwed at its upstream and 28a into the gas tank 29. The transparent part 28 situated between the gas tank 29 and the top member 27 allows to monitor the amount of the liquefied gas remained in the gas tank 29 visually from the outside. A stepped nut 28c having flat sides is vertically held at 31 between to the upper and lower half parts 27a, 27b while being prevented from rotation and slip off.

Also as shown in FIG. 10, a discharge valve 32 is fixed through the inside of the discharge valve holder 28 for the flow rate control and ON-OFF control of the gas supplied from the gas tank 29.

As specifically shown in FIG. 13, the discharge valve 32 has a generally cylindrical valve case 36 fixed to the nut 28c of the valve holder 28 by means of an O-ring 26b. A porous rod 37 made of open-cell foamed plastics such as polystyrene, polyvinyl chloride, etc or cellulose fibers is screwed into the upstream end of the valve case 36 for introducing the liquefied gas from the gas tank 29 to the inside of the valve case 36. A flow control member 38 having a knurl circumference 38a for mounting the flow control actuator 33 is inserted adjustably in the valve case 36 from the downstream. A cylindrical retainer 40 is disposed to the upstream of the flow control member 38 such that it is sealed in a face-to-face contact to the flow control member 38, and also sealed slidably to the inside of the valve case 36 by means of an O-ring 39. Gas restriction discs 41a, 41b are disposed between the retainer 40 and a reduced diameter part 36a formed in the valve case 36.

The gas restriction disc 41a is made of relatively soft material having a plurality of fine pores therein such as, for example, open-cell foamed polyurethane with a high foaming density, and the gas restriction disc 41b is made of relatively rigid material having less fine pores such as, for example, polypropylene fibers, acetyl-cellulose fibers or the likes. The liquefied gas introduced through the porous rod 37 to the inside of the valve case 36 is evaporized during passage through both of the gas restriction discs 41a, 41b. Rotation of the flow control member 38 can be converted into the axial pitch movement of the retainer 40, whereby the gas restriction discs 41a, 41b, mainly, the disc 41a is compressed or allowed to expand to vary the porosity therein and the flow rate of the gas passed through the disc 41a can be controlled accurately and easily by the rotation of the flow control member 38.

A cylindrical valve body 42 closed at the upstream end is incorporated axially slidably to the inside of the flow control member 38 and the retainer 40. The valve body 42 is sealed against the flow control member 38 by an O-ring 43 and always biased resiliently toward the upstream by means of a spring 44. In this urged state shown in FIG. 13, the upstream end of the valve 42 is in a sealing contact with the inner circumferential surface of the retainer 40, so that the gas supplied from the gas restriction discs 41a, 41b is not fed to the inside of the valve body 42. While on the other hand, when the valve body 42 is caused to slide to the downstream against the resiliency of the spring 44, the contact between the valve body 42 and the retainer 40 is released, so that the gas supplied from the gas restriction discs 41a, 41b is introduced by way of the communication aperture 42a to the inside of the valve body 42.

As shown in FIG. 13, an E-ring 45 is mounted to the protruding end of the valve body 42 for interlocking the valve body 42 with an ON-OFF actuator 34 disposed to the grip casing (FIG. 10).

As shown in FIGS. 10, 11 and 14, a disc-like flow control actuator 33 is mounted on the knurl circumference 38a of the flow control member 38 and an actuation knob 33a protruded from the upper circumferential edge thereof is loosely inserted through a guide hole 47 perforated in the upper half part 27b of the top member 27. As shown in FIGS. 11, 14 and, particularly, FIG. 16, the guide hole 47 extends circumferentially for a predetermined length, so that the actuation knob 33a is rotated along the guide hole 47 over a desired range. A concaved part 47a is formed around the upper periphery of the guide hole 47 while being diverged toward the outer circumferential surface of the upper half part 27b so as to situate the top of the actuation knob 33a within the concaved part 47a. This facilitates the easy manipulation to the flow control actuator 33 while preventing incidental touch during use of the soldering iron.

As shown in FIG. 17, the ON-OFF actuator 34 mounted at the protruding end of the valve body 42 is in a disc-like shape having a V-shaped recess 34a at its lower part and an actuation knob 34b is protruded from the upper circumferential edge of the disc.

As shown in FIG. 15 through FIG. 17 (also in FIG. 11), a guide hole 48 is recessed circumferentially for a predetermined length so that the actuation knob 34b loosely engaged therein can be rotated along the guide hole 48 over a desired range. Both circumferential ends of the guide hole 48 are laterally bent into a valve closing slot 48a and a valve opening slot 48b respectively such that as the actuation knob 34b comes to the both rotational ends, it can be snapped into the slots 48a, 48b under the resiliency of the spring 35.

While on the other hand, as shown in FIGS. 17 and 18 (also in FIG. 10 and FIG. 11), a slide guide 49 is disposed at the position inside of the lower half part 27a opposing diametrically to the actuating knob 34b. The slide guide 49 has a cam surface for supporting the lower end of the ON-OFF actuator 34 on the upstream side so that the lower end of the actuator may be advanced and retracted axially as it rotates circumferentially.

More specifically, as shown in FIGS. 17 and 18, the slide guide 48 comprises a full-close position retainer face 49a at the upstream perpendicular to the axial line, a full-open position retainer face 49b at the downstream perpendicular to the axial line and an intermediate transit face between them slanted by a predetermined angle relative to the plane in perpendicular to the axial line.

When the actuation knob 34b is engaged, for instance, in the valve closing slot 48a of the guide hole 48, the lower end of the ON-OFF actuator 34 is in contact with the full-close position retainer face 49a as shown in FIG. 17. Then, as the actuation knob 34b is rotated toward the valve opening slot 48b, the lower end of the ON-OFF actuator 34 is caused to slide along the inclined surface 49c and then rides on the full-open position retainer face 49b.

Thus, the lower portion of the ON-OFF member 34, swings in the axial direction with respect to the actuation knob 34b as a fulcrum, by which the valve body 42 interlocked at the disc center of the ON-OFF actuator 34 is also caused to slide axially to close or open the valve 32. The slide guide 49 may be formed integral to the lower half member 27a or prepared separately from the member 27a and subsequently secured to the inner surface thereof.

The ON-OFF actuator 34 can be modified, for instance, as shown in the later FIGS. 29 through 32. In FIGS. 29 and 30, a disc-like ON-OFF actuator 34 has a protrusion 34c to be guided along the cam surface of a slide guide 49 along each of faces 49a, 49b, 49c as the rotation of the ON-OFF actuator 34. In FIGS. 31 and 32, an ON-OFF actuator 34 has a inclined surface 34d to be operationally combined with a slide guide 49. The operation and the effect of the embodiments shown in FIGS. 29 through 32 are the same as those in the previous embodiment.

As shown in FIGS. 10 and 11 (and most clearly in FIG. 16), each of the parts 27a, 27b of the top member 27 has a threaded part 50 for screw engagement with the connection nut (refer to FIG. 2). A bulged part 51 is cut flat at the bottom of the lower half part 27a so that the soldering iron may be placed stably on a working table (not shown). Further, as shown in FIGS. 15, 18 and 19 (also in FIGS. 10, 11), at the inner wall of the parts 27a, 27b, are formed a circular bore 52 for receiving the upstream end of the gas mixture generation member 17 and a hexagonal bore 53 for receiving the upstream end of the connection member 21 respectively.

Also as shown in FIGS. 10, 11, 15 and 19, a guide groove 54 is formed at the inside of the upper half part 27b for the guidance of the connection part 25a of the actuation lever 25 in a sliding contact under the resiliency of the spring part 25c. A guide hole 55 is perforated through the wall of the upper half part 27b for defining the sliding range of the actuation button 26. Further, as shown in FIG. 10, FIGS. 11, 18 and 19, a pair of guides 56 are disposed to the lower half part 27a for guiding the slidable movement of the portion 25b of the actuation lever 25 from both sides.

The operation of the gas-heated soldering iron having the foregoing constitution is to be explained.

Upon using the soldering iron, the actuation button 26 is at first caused to slide toward the upstream along the guide hole 55 (rightward, for example, in FIG. 10). Then, the shutter member 24 interlocking with the button 26 is retracted to a position shown by the solid line in FIG. 3 to open both of the ignition ports 10, 11a. Since the spring part 25c of the actuation lever 25 is always in a press contact with the guide groove 54 in the upper half part 27b, both of the ignition ports 10, 11a are kept open stably. Further, since the actuation lever 25 is guided along the guide groove 54 and the guides 56, while the actuation button 26 is guided along the guide hole 55, the shutter member 24 can be opened or closed smoothly (FIG. 19).

After retracting the shutter member 24, the flow control actuator 33 is rotated, for instance, counter-clockwise to a desired position. Then, the flow control member 38 is withdrawn to the left along the threads toward downstream to displace the member 40 and thus removes the compressive pressure from the filter 41a (FIG. 13). Thus, the gas discharged from the discharge valve 32 is controlled to a predetermined flow rate. In this case, the setting for the gas flow rate can be attained with ease, for instance, by attaching an appropriate scale along the circumferential direction of FIG. 2). The evaporized gas is sent further by way of the filter member 19 and through the nozzle plate 18 assembled into the gas mixture generation member 17 (FIG. 2). In this case, since the filter member 19 is disposed at the inlet of the nozzle plate 18, obstacles contained if any in the gas not removed by the porous rod 37 or the gas restriction members 41a, 41b can completely be removed in the filter member 19, so that clogging in the nozzle plate 18 can be prevented. Furthermore, if larger particles of liquefied gas are incorporated in the evaporated gas, they are converted into finer particles while passing through the filter member 19 and completely gassified till they reach the nozzle plate 18.

In this way, when the evaporated gas is jetted out from the nozzle 18 at a high velocity, external airs are attracted through the air introduction ports 9 and 23 into the gas mixture generation member 17 under the ejector effect created by the jet stream of the gas, to form a gas mixture composed of the evaporized gas and the air. The gas mixture is mixed more uniformly while passing through the relatively long connection pipe 15 and then introduced to the inside of the fire nozzle 11.

Upon entrance into the fire nozzle 11, the gas mixture from the connection pipe 15 prevails smoothly along the tapered part 14 into the small bore 12. Then, a part of the gas mixture is jetted out through the inside of the the guide hole 47, so that desired soldering temperature can be obtained.

Then, the actuation knob 34b held in the valve closing slot 48a at the end of the guide hole 48 is rotated along the guide hole 48 to the valve opening slot 48b (FIGS. 16 and 17). This causes the ON-OFF actuator 34 to rotate counter-clockwise and, accordingly, the V-cut edge (left edge in FIG. 17) of the ON-OFF actuator 34 is displaced toward the downstream end in the axial direction while being guided along the cam face 49a, 49c, 49b of the slide guide 49. Interlocking with the above axial displacement of the ON-OFF actuator 34, the valve body 42 of the discharge valve 32 is also caused to slide toward the downstream against the resiliency of the spring 44 to thereby release the face-to-face contact state (FIG. 13) between the upstream end of the valve body 42 and the inside of the retainer 40.

When the valve body comes out of the retainer 40, the liquefied gas within the gas tank 29 is introduced by way of the porous rod 37 to the inside of the valve case 36 while being evaporized and under the flow rate control in the gas restriction members 41a, 41b. The evaporized gas is introduced through the inside of the retainer 40 and by way of the communication aperture 42a into the valve body 42 and, in turn, by way of the flexible tube 46 to the connection member 21 shown in FIGS. 11 (and also in central cylinder 16a and another part of the gas mixture is jetted out through the peripheral channels between each of the teeth of the gear-like member 16b of the rectifying member 16. The gas mixture from the central cylinder 16a attracts the peripheral gas mixture jetter out from the gear-like part 16b to form a uniform and stable gas flow gradually converged toward the downstream. In this case, since the connection pipe 15 is relatively long and made of stainless steel of comparatively low heat conductivity, if the temperature at the fire nozzle 11 rises to about 350° C. upon ignition, the heat is less conducted toward the grip casing 5. This heat insulation effect may be improved further by attaching adequate heat dissipation fins to the pipe 15.

When the gas mixture is jetted out of the fire nozzle 11, it is ignited using an adequate ignition device such as a gas lighter not illustrated through both of the ignition ports 10, 11a. Due to the rectifying effect of the rectifying member 16 protruded into the larger bore 13, a large, smooth and rectified flame F is formed stably as shown by the phantom line in FIG. 3, and its downstream top end at a high temperature is directed to the inlet of the combustion chamber 2. Then, the combustion catalyst 6 in the chamber 2 is rapidly heated and starts its oxidizing reaction only within 1-2 sec after the ignition. Further, since the gas flame F is rectified in the converged shape as described above, there is no worry that the flame is wastefully exposed to the outside through the ignition ports 10, 11a.

After the oxidizing reaction has been started in the combustion chamber 2, the shutter member 24 retracted to the solid line is advanced toward the downstream till the position shown by the phantom line in FIG. 3 to close both of the ignition ports 10, 11a. Then, the gas flame F is distinguished due to the closure of the ignition ports 10, 11a and the gas mixture is jetted as it is from the fire nozzle 16. Once the combustion catalyst 6 has started its oxidizing reaction and reached at a desired combustion temperature, ignition gas flame is no more necessary but the catalytic combustion can be continued by merely supplying the gas mixture under the closure of the ignition ports 9.

The gas mixture passes through the through holes 6a and the U-shaped circumferential groove 6b formed in the combustion catalyst 6, put into contact with the catalyst heated to a high temperature and then discharged from the exhaust gas port 7 of the combustion chamber 2, whereby flameless and complete combustion is taken place by the aid of the combustion catalyst 6.

In this case, since the through holes 6a and the circumferential grooves 6b constitute the linear gas flow channel continuously from the upstream to the downstream in the combustion chamber 2, the gas mixture undergoes no substantial flow resistance when passing through the combustion chamber 2 and thus results in no gas pressure loss. Consequently, liquefied gas can be evaporated effectively at the gas tank 29 to obtain a sufficient ejector effect at the nozzle plate 18. Then, a sufficient amount of air can be sucked into the gas stream to prepare a desired gas mixture and flameless and more complete combustion can be taken place even in a small volume of a combustion chamber which has been impossible so far. Furthermore, after the ignition to the combustion catalyst 6 and the closure of the ignition port 9, since the combustion is taken place entirely within the combustion chamber 2 and not at the exit of the fire nozzle 16, safety and effective combustion at a high temperature can be obtained.

While the heat generated at the combustion chamber 2 may slightly be transmitted also to the side of the grip casing 5, the heat can be removed by the heat absorption that occurs upon evaporation of the liquefied gas from the gas tank. In another point of view, such heat transmission from the combustion chamber 2 can promote the evaporization of the liquefied gas in the gas tank 29.

As described above, the heat processing apparatus of this invention embodied as a gas-heated soldering or desoldering iron can provide various merits as below.

Basically, catalytic combustion using liquefied gas as a heat source enables to obtain a desired amount of soldering heat with no troubles of current leak to a work.

The gas flow channel with less flow resistance formed to the catalyst can make the catalytic combustion more complete and efficient and with no risk of dangerous gas flame exposure.

The ignition means provided with the shutter mechanism can ensure more rapid and effective ignition while completely eliminating the danger of gas flame exposure.

Provision of the gas flow rectifying means can shorten the stand-by time till the soldering iron attains a desired working temperature in a compact structure, while emphasizing the foregoing advantages as well.

Although, this invention has been described with respect to the ordinary contact type soldering iron, it may be applicable also to a so-called hot-blow type soldering iron or the like, and such variation can be obtained by modifying the structure of the iron tip and the combustion chamber.

FIG. 20 through FIG. 28 show various embodiments for the tip and the combustion chamber.

Figure 20:
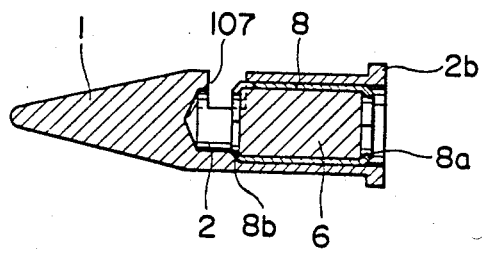

In the embodiment shown in FIG. 20, a rectangular exhaust gas port 107 is circumferentially cut into the wall of the combustion chamber 2 and the catalyst is enhoused within a protection cylinder 8 and fixed stably at the caulked parts 8a, 8b. Since a large perforation can be made with ease for the gas port 107 as desired, smooth and efficient exhaustion can be obtained.

Figure 21:
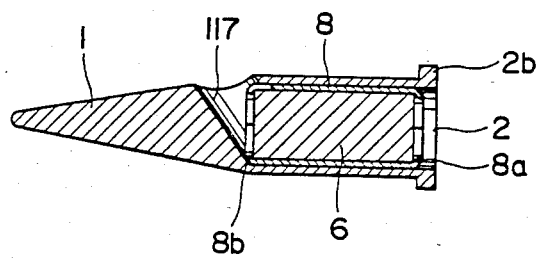

In the embodiment shown in FIG. 21, more efficient exhaustion of the combustion gas may be obtained by orthogonally opening an exhaust port 117.

Figure 22:
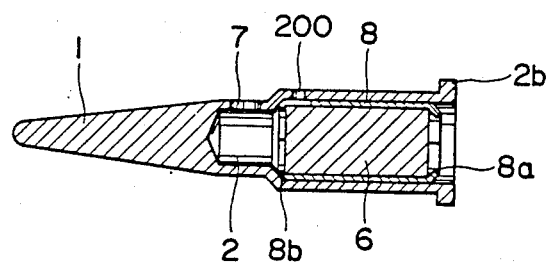

In the embodiment shown in FIG. 22, a monitor hole 200 is formed through the wall of the combustion chamber 2 in addition to the exhaust gas port 7, so that the combustion temperature of the catalyst 6 can be observed visually by the color of light emitted therefrom.

Figure 23:
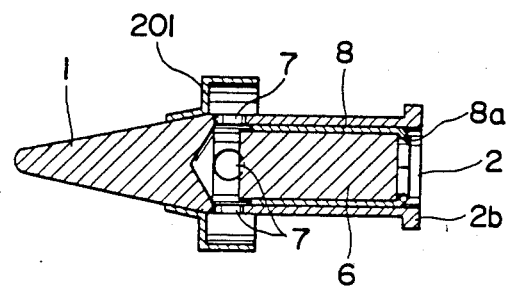
Figure 24:
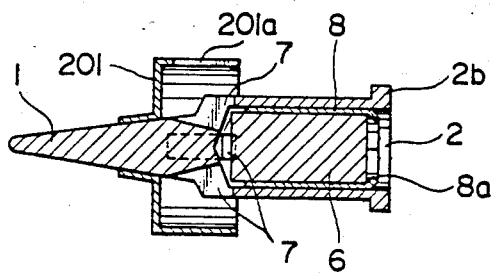

In the embodiment shown in FIGS. 23 and 24, a protection or buffle cover 201 is attached, so that the exhaust gas from the exhaust gas port 7 may be deviated from the iron tip 1, and a work or the peripheral area thereof can be protected from a hot stream of the exhaust gas during soldering. In FIG. 24, the cover 201 has a monitor hole 201a and the exhaust gas port is slanted.

Figure 25:
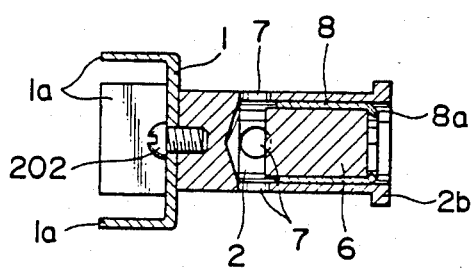
Figure 26:
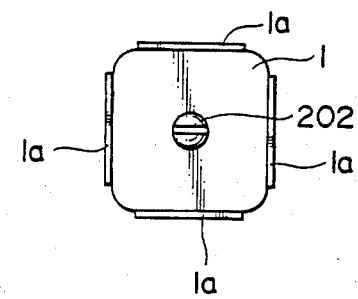

In the embodiment shown in FIGS. 25 and 26, a tip 1 together with a particular shape of a tip plate 1a are detachably attached to a combustion chamber 2a by means of a screw 202 so as to facilitate the replacement of the tip plate tip 1a. In a case of soldering or desoldering, for example, plug-in type IC packages, tip plates 1a of various size and shape are required depending on the pin arrangement and this embodiment is conveniently used in such a case.

In the embodiment shown in FIG. 27, a tip 1 and a tip plate 1a integrally provided with a connection cylinder 1b are detachably mounted at the downstream end of a combustion chamber 2a, and an exhaust gas port 7 is formed to the cylinder 1b. A monitor hole 200 is formed at the downstream end of the combustion chamber 2a. In this embodiment, the tip 1 can be heated with the heat of the exhaust gas as well as by the heat conducted by way of the cylinder 1b to obtain a disired high temperature in a short time. Furthermore, by removing the tip 1 and the cylinder 1b, the exhaust gas can be used as a hot blow for soldering or desoldering work.

In the embodiment shown in FIG. 28, an exhaust gas port 7 is opened at the top end of the tip 1 so that a work is processed exclusively by a hot blow of the exhaust gas.

In the embodiment shown in FIG. 28 (also in FIG. 27), since the non-oxidative exhaust gas shields a work under heat-processing from atmospheric air (oxygen), satisfactory soldering or like other heat processing can be attained for a work with no undesired oxidation. The hot-blow type soldering iron can of course be used for the fabrication of thermoplastic materials and fusing of adhesives.

Finally, as described above, the flameless and complete combustion of the liquefied gas in the gas-heating apparatus according to this invention can be obtained, basically, by the use of the combustion catalyst. Conventionally, platinum type combustion catalyst have widely been employed in petroleum stoves, catalytic exhaust gas muffles of automobiles or the likes. However, these platinum catalysts are intended to work at a relatively low combustion temperature and can not be applied as the combustion catalyst for the soldering iron operated on liquefied gas such as butane gas, which requires to satisfy more severe and specific conditions.

Specifically, it is necessary that the combustion catalyst for use in the heat processing apparatus such as a gas-heated soldering iron can start the oxidizing reaction rapidly and at a relatively low temperature, while enduring a high combustion temperature during use. Moreover, the catalyst and the catalyst support should have excellent thermal impact shock and mechanical strength. In addition, it is also necessary that the catalyst component does not sinter into the support at a high temperature during use.

The combustion catalyst capable of satisfying the foregoing conditions has been proposed by the present inventor in Japanese Patent Application filed on Dec. 15, 1982 and it can preferably be used in the heat processing apparatus according to this invention. The novel combustion catalyst comprises a catalyst component composed of 90–98% by weight of platinum and 2–10% by weight of rhodium carried on a porous catalyst support mainly composed of alumina and having a gamma-alumina coating on the surface of the support.

Incorporation of rhodium to platinum as the catalyst component can significantly improve the complete combustion effect of the liquefied gas at a relatively low temperature, as well as drastically shorten the time from the ignition to the start of the oxidizing reaction. The catalyst component is preferably used by about 2–10 % by weight based on the weight of the catalyst support.

The porous ceramic mainly composed of alumina used for the catalyst support can significantly improve the thermal characteristic such as heat resistance and thermal impact shock as well as mechanical strength. Furthermore, it enables uniform adsorption of the catalyst component on the support. In order to attain the foregoing advantageous effects, the apparent porosity (as determined by the water absorption) of the porous ceramic is preferably in a range between 15–30%. The ceramic preferably comprises alumina as a main ingredient and further contains silica. They include, for instance, mullite ceramic ($3Al_2O_3.2SiO_2$) or alumina ceramic ($Al_2O_3$ more than 85%). If the water absorption of the porous ceramic support is less than 15%, no sufficient adsorption area for the catalyst component can be obtained. Further, the thermal impact shock against rapid heat cycles upon soldering becomes insufficient, as well as the heat insulating property is reduced. While on the hand, if the water absorption exceeds 30%, the mechanical strength is reduced and the expensive catalyst component wastefully impregnates from the surface to the inside of the catalyst that has no concern with the reaction.

It is further preferred that a gamma-alumina coating is applied to the catalyst support prior to the deposition of the catalyst component so that the catalyst component may not be intruded to the inside of the support and shorten the working like of the catalyst when it is used at an extremely high temperature.

The gamma-coating can be obtained, for instance, by applying aluminum hydroxide gel on a ceramic support by way of coating or immersion, heating the same to dehydrate and then converting the same into gamma-alumina by keeping it at a temperature of about 900° C. The gamma-alumina coating can also prevent the excess penetration of the catalyst dispersion to the inside of the support upon coating.

The platinum rhodium catalyst component is coated while being dispersed in a colloidal aluminum hydroxide gel onto the catalyst support and baked at a high temperature. This facilitates the more uniform adsorption of the catalyst component on the catalyst support.

What is claimed is:

1. A heat processing apparatus using a liquefied gas as a heat source comprising:
   a nozzle for jetting out a combustible gas from a liquefied gas tank by way of a gas discharge valve assembly,
   a gas mixture generation means disposed at the exit of said nozzle for introducing external air to a stream of said combustible gas jetted out from said nozzle under the ejector effect to thereby generate a gas mixture,
   a gas mixture supply means for supplying the thus generated gas mixture to the downstream portion of the apparatus,
   means including openings for igniting said gas mixture disposed at the downstream end of said gas mixture supply means surrounding the stream of said gas mixture at the downstream end of said gas mixture supply means for introducing additional external air through said openings and for igniting said gas mixture,
   means forming a shutter mechanism to open and close said ignition openings,
   means forming a combustion chamber disposed at the downstream end of said ignition openings and having an inlet at its upstream end for receiving the stream of said gas mixture and an exhaust gas port at its downstream end for discharging exhaust gases,
   a combustion catalyst disposed to the inside of said combustion chamber, said catalyst being formed with gas flow passages extended continuously from the upstream to the downstream ends of said chamber so as to decrease the flow resistance to said gas mixture passing therethrough, and
   an iron tip connected to the downstream end of said combustion chamber for use in the fabrication of a work.

2. The heat processing apparatus as defined in claim 1, wherein the gas flow passages comprises through holes disposed to the inside of the catalyst and/or peripheral grooves formed at the outer circumference of said catalyst from the upstream to the downstream ends thereof.

3. The heat processing apparatus as defined in claim 1, wherein the shutter mechanism comprises a tubular shutter member disposed coaxially along a surrounding wall and an actuation member connected to said tubular shutter member for causing said shutter member to slide to thereby open or close said ignition openings.

4. The heat processing apparatus as defined in claim 1, wherein a gas flow rectifying means is disposed at the downstream end of the gas mixture supplying means for controlling the flowing direction of the gas mixture jetted out from the downstream end of said gas mixture supply means so as to converge the gas stream toward the combustion chamber.

5. The heat processing apparatus as defined in claim 4, wherein the gas flow rectifying means comprises a main gas flow cylinder disposed at an axial gas flowing center of the gas mixture supply means and a plurality of auxiliary gas flow channels disposed around the outer periphery of said main gas flow cylinder.

6. The heat processing apparatus as defined in claim 1, wherein the exhaust gas port of the combustion chamber is opened in a direction so as to substantially deviate the gas stream from the top end of the iron tip.

7. The heat processing apparatus as defined in claim 1, wherein the tip is made detachable from the combustion chamber.

8. The heat processing apparatus as defined in claim 1, including means for detaching the iron tip together with the combustion chamber from the remaining part of the apparatus.

9. The heat processing apparatus as defined in claim 1, wherein a monitor hole for the combustion catalyst is formed through the wall of the combustion chamber.

10. The heat processing apparatus as defined in claim 1, wherein the exhaust gas port is used as a monitor hole.

11. The heat processing apparatus as defined in claim 1, wherein the gas discharge valve assembly comprises a valve body disposed within a casing and adapted to slide toward the downstream end of the casing against a resiliency of a spring to discharge the liquefied gas out of the liquefied gas tank, a rotatable ON-OFF actuation member mounted to said valve body so as to be slidable integrally therewith at least on the downstream sliding of said body, an actuation knob loosely engaged within a guide hole circumferentially perforated in said casing so as to rotate said ON-OFF actuation member externally by way of said actuation knob, and a guide member disposed to the inside of said casing at a position diametraically opposing to said guide hole for guiding said ON-OFF actuation member such that at least a portion of said actuation member to be guided is displaced along the sliding direction of said valve body accompanying the rotation of said actuation member to thereby open and close said discharge valve.

* * * * *